US011826706B2

(12) United States Patent
McGovern (10) Patent No.: US 11,826,706 B2
(45) Date of Patent: Nov. 28, 2023

(54) FLOW CONTROL IN LARGE-NUMBERED, SERIES-COUPLED VESSELS OF REVERSE OSMOSIS SYSTEMS

(71) Applicant: Sandymount Technologies Corporation, Woburn, MA (US)

(72) Inventor: Ronan K. McGovern, Cambridge, MA (US)

(73) Assignee: Alfa Laval Copenhagen A/S, Soborg (DK)

(*) Notice: Subject to any disclaimer, the term of this patent is extended or adjusted under 35 U.S.C. 154(b) by 853 days.

(21) Appl. No.: 16/761,744

(22) PCT Filed: Nov. 6, 2018

(86) PCT No.: PCT/US2018/059483
§ 371 (c)(1),
(2) Date: May 5, 2020

(87) PCT Pub. No.: WO2019/090349
PCT Pub. Date: May 9, 2019

(65) Prior Publication Data
US 2020/0261850 A1    Aug. 20, 2020

Related U.S. Application Data

(60) Provisional application No. 62/582,145, filed on Nov. 6, 2017.

(51) Int. Cl.
*B01D 61/02* (2006.01)
*B01D 61/08* (2006.01)
*B01D 61/10* (2006.01)

(52) U.S. Cl.
CPC .......... *B01D 61/025* (2013.01); *B01D 61/08* (2013.01); *B01D 61/026* (2022.08); *B01D 61/10* (2013.01);
(Continued)

(58) Field of Classification Search
CPC .... B01D 61/025; B01D 61/026; B01D 61/10; B01D 2311/06; B01D 2317/022; B01D 2317/025
See application file for complete search history.

(56) References Cited

U.S. PATENT DOCUMENTS

| 4,046,685 A * | 9/1977 | Bray | B01D 61/026 |
| | | | 210/321.83 |
| 4,999,209 A * | 3/1991 | Gnekow | C12H 3/04 |
| | | | 426/330.4 |

(Continued)

FOREIGN PATENT DOCUMENTS

WO    WO2017/168425    10/2017

OTHER PUBLICATIONS

Saif, Yousef, Ali Almansoori, and Ali Elkamel. "Optimal design of split partial second pass reverse osmosis network for desalination applications." AIChE Journal 60.2 (2014): 520-532. (Year: 2014).*
ISA/US, International Search Report and Written Opinion dated Jan. 16, 2019 for international application No. PCT/US2018/059483 (12 pages).

*Primary Examiner* — Bradley R Spies
(74) *Attorney, Agent, or Firm* — Sunstein LLP (57) ABSTRACT

A reverse osmosis filtration system includes a set of two or more reverse osmosis pressure vessels coupled in series, each pressure vessel having one or more reverse osmosis membrane elements, a feed inlet, a retentate outlet, a permeate outlet. The pressure vessels are coupled so that each successive pressure vessel has (a) its feed inlet coupled to the retentate outlet of its preceding pressure vessel and (b) its permeate outlet coupled to the permeate outlet of its preceding pressure vessel. The permeate outlet of at least one pressure vessel includes a front permeate outlet and the permeate outlet of at least one other pressure vessel includes (Continued)

a back permeate outlet. The back permeate outlet of one pressure vessel is coupled to the front permeate outlet of a successive pressure vessel.

17 Claims, 6 Drawing Sheets

(52) U.S. Cl.
CPC ...... *B01D 2311/04* (2013.01); *B01D 2311/06* (2013.01); *B01D 2311/14* (2013.01); *B01D 2313/18* (2013.01); *B01D 2313/243* (2013.01); *B01D 2317/022* (2013.01); *B01D 2317/025* (2013.01); *B01D 2317/04* (2013.01)

(56) References Cited

U.S. PATENT DOCUMENTS

| | | | |
|---|---|---|---|
| 9,206,060 B1* | 12/2015 | Abusharkh | C02F 1/441 |
| 2002/0108900 A1* | 8/2002 | Hirose | B01D 61/026 |
| | | | 210/321.74 |
| 2004/0134521 A1* | 7/2004 | Liberman | B01D 65/08 |
| | | | 134/99.1 |
| 2005/0029192 A1 | 2/2005 | Arnold et al. | |
| 2010/0282676 A1 | 11/2010 | Liberman et al. | |
| 2014/0326665 A1* | 11/2014 | Feldstein | C02F 1/008 |
| | | | 210/652 |
| 2016/0136577 A1 | 5/2016 | McGovern et al. | |

* cited by examiner

FLOW CONTROL IN LARGE-NUMBERED, SERIES-COUPLED VESSELS OF REVERSE OSMOSIS SYSTEMS

CROSS-REFERENCE TO RELATED APPLICATIONS

This application is a national phase entry of International Application No. PCT/US18/59483, filed Nov. 6, 2018, and claims priority to U.S. Provisional Patent Application No. 62/582,145, filed Nov. 6, 2017, the disclosures of which are incorporated by reference herein in their entirety.

TECHNICAL FIELD

The present invention relates to flow control in reverse osmosis systems, and more particularly to systems and methods for flow control in large-numbered, series-coupled vessels of reverse osmosis systems.

SUMMARY OF THE EMBODIMENTS

In accordance with one embodiment of the invention, a reverse osmosis filtration system includes a set of two or more reverse osmosis pressure vessels coupled in series, each pressure vessel having one or more, preferably one to nine, reverse osmosis membrane elements. Each pressure vessel also includes a feed inlet, a retentate outlet, and a permeate outlet. The pressure vessels are coupled so that each successive pressure vessel has (a) its feed inlet coupled to the retentate outlet of its preceding pressure vessel and (b) its permeate outlet coupled to the permeate outlet of its preceding pressure vessel. The permeate outlet of at least one pressure vessel includes a front permeate outlet and the permeate outlet of at least one other pressure vessel includes a back permeate outlet. The back permeate outlet of one pressure vessel is coupled to the front permeate outlet of a successive pressure vessel.

In a related embodiment, the set includes up to 25 reverse osmosis pressure vessels. Optionally, each of the pressure vessels has three to four reverse osmosis membrane elements. Optionally, each reverse osmosis membrane element is spiral wound.

In another related embodiment, each reverse osmosis membrane element is about 37 to about 43 inches in length. Optionally, the filtration system is configured to filter ethanol from alcoholic beverages.

In another related embodiment, the permeate outlet of a last pressure vessel in the set is also coupled to the feed inlet of a first pressure vessel in the set to provide a recycling flow path. Optionally, the system includes a first pass unit having a first stage unit and a second stage unit, the set of two or more filtration vessels is distributed between the first and second stage units.

In yet another related embodiment, the feed inlet of a first one of the set of two or more pressure vessels is coupled to a high-pressure pump. Optionally, an inlet of the high-pressure pump is coupled to a heat exchanger. Optionally, an inlet of the heat exchanger is coupled to a low-pressure pump. In another related embodiment, the permeate outlet of a first one of the set of two or more filtration vessel is coupled to a high-pressure pump. Optionally, the high-pressure pump coupled to the permeate outlet is further coupled to an inlet of one of an additional set of reverse osmosis pressure vessels, each of the pressure vessels of the additional set being coupled in series to one another.

In another related embodiment, the system further includes a set of cleaning inlets coupled to a cleaning tank, each cleaning inlet coupled in parallel to a feed inlet or retentate outlet of a first end of a corresponding one of the set of pressure vessels. Optionally, the system further includes a set of cleaning outlets, each cleaning outlet coupled in parallel to a feed inlet or retentate outlet of a second end of a corresponding one of the set of pressure vessels. Optionally, the system further includes a low-pressure pump coupled to the set of cleaning inlets. In yet another related embodiment, a permeate outlet of an intermediate one of the set of two or more pressure vessels is coupled to the feed inlet of a first of the set of two or more pressure vessels.

In yet another related embodiment, the system further includes at least one back-flow preventor configured to prevent a reverse surge of permeate through the one or more reverse osmosis membrane elements.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" has at least one member.

The term "manifold" as used in herein is a coupling between a flow line and a plurality of upstream or downstream flow paths, wherein for example, the plurality of flow paths may be associated with outlets of pressure vessels.

Disclosed herein are multi-pass, multi-stage reverse osmosis systems for the concentration of beverages, including alcoholic beverages, that allow for easy and stable flow control and avoid the need for buffer tanks or flow pacing between passes, such as the first pass and the second pass. Systems described include multi-stage reverse osmosis systems that operate at low temperatures and high pressures, which are capable of reaching high beverage concentrations and are easily cleanable.

Flow Control

Figure 1:
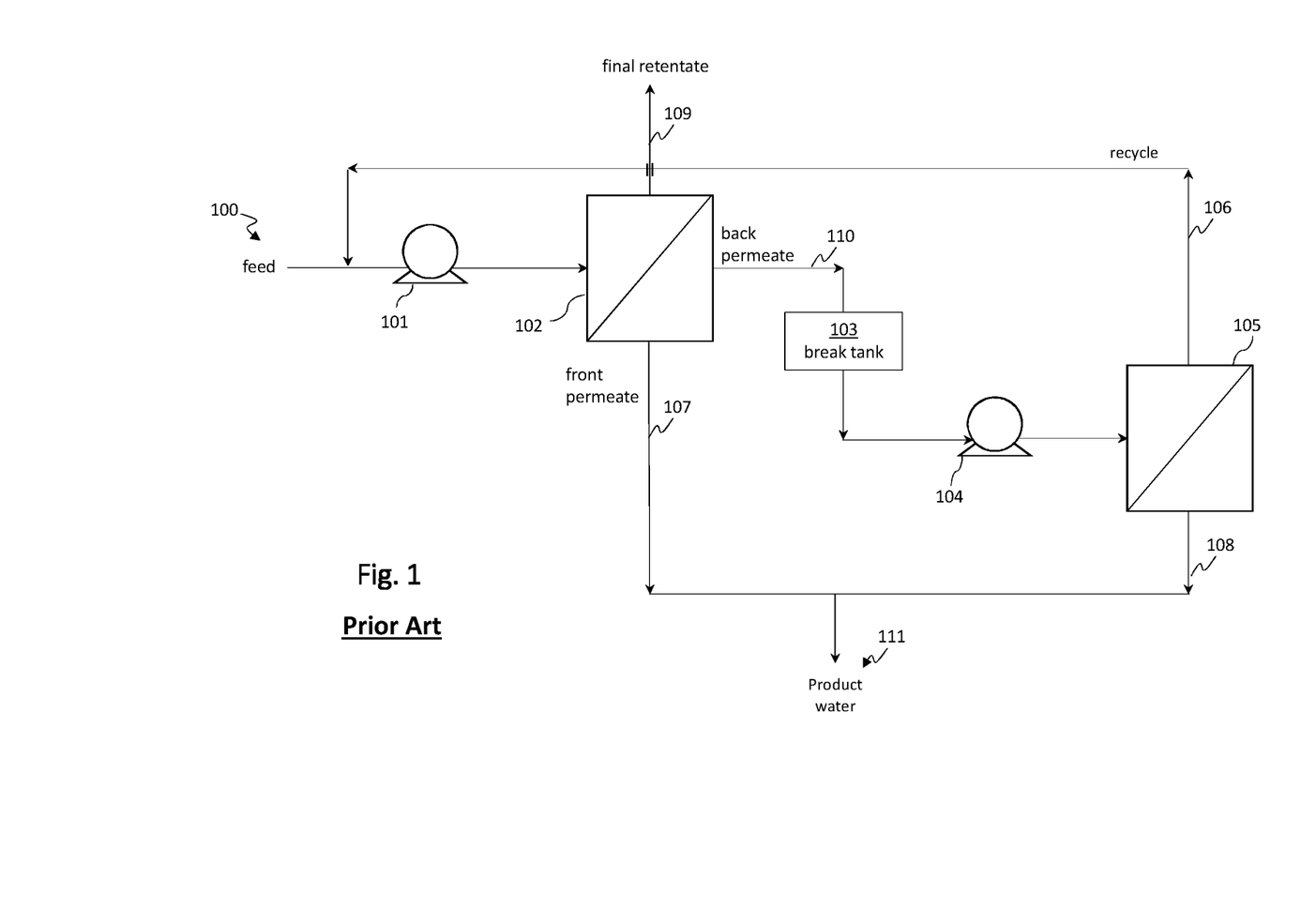
FIG. 1 is a diagram of a conventional split partial second pass reverse osmosis system.

FIG. 1 is a diagram of a conventional split partial second pass reverse osmosis system. A liquid feed 100 including a solvent and a solute is directed to a high pressure pump 101, where it is pressurized and directed to a first reverse osmosis unit 102. This unit 102 typically includes one or more pressure vessels, each vessel containing one or more membrane elements. The pressure vessel is configured such that feed 100 enters one end of the pressure vessel 102 so as to produce at another end a retentate 109, which is enriched in the solute. The elements within the pressure vessel 102 are fluidly coupled. Permeate may be withdrawn from either end, or both ends, of the pressure vessel 102. In a split partial second pass configuration, a permeate plug is often introduced between two elements in the pressure vessel 102 so that the permeate is split. The permeate exiting nearest the feed inlet (the front permeate 107) is often lower in solute concentration than the permeate exiting nearest the retentate outlet (back permeate 110).

In a typical split partial second pass implementation, the back permeate 110 is directed to a break tank 103, and then to a second pump 104 before being fed to a second reverse osmosis unit 105. The purpose of the break tank 103 is to provide a buffer if the flow rates of the back permeate and the second pump are not perfectly matched. An alternate approach is to flow pace the second pump 104 with the flow rate of the back permeate 110 and eliminate the use of the break tank 103. In this case, special care is needed to ensure the stability of the inlet pressure to the second pump 104. If the pressure at the inlet of the second pump 104 drops by too much, it could risk cavitation damage to the pump. Conversely, if the pressure at the inlet to the second pump 104 rises too much, there may be damage to the inlet seals of the second pump. The pump 104 feeds the back permeate 110 to a second reverse osmosis unit 105. Retentate 106 from the second reverse osmosis unit 105 is recycled to the feed 100, while the front permeate 107 from the first unit 102 is blended with permeate 108 from the second reverse osmosis unit 105 to create product water 111.

Figure 2:
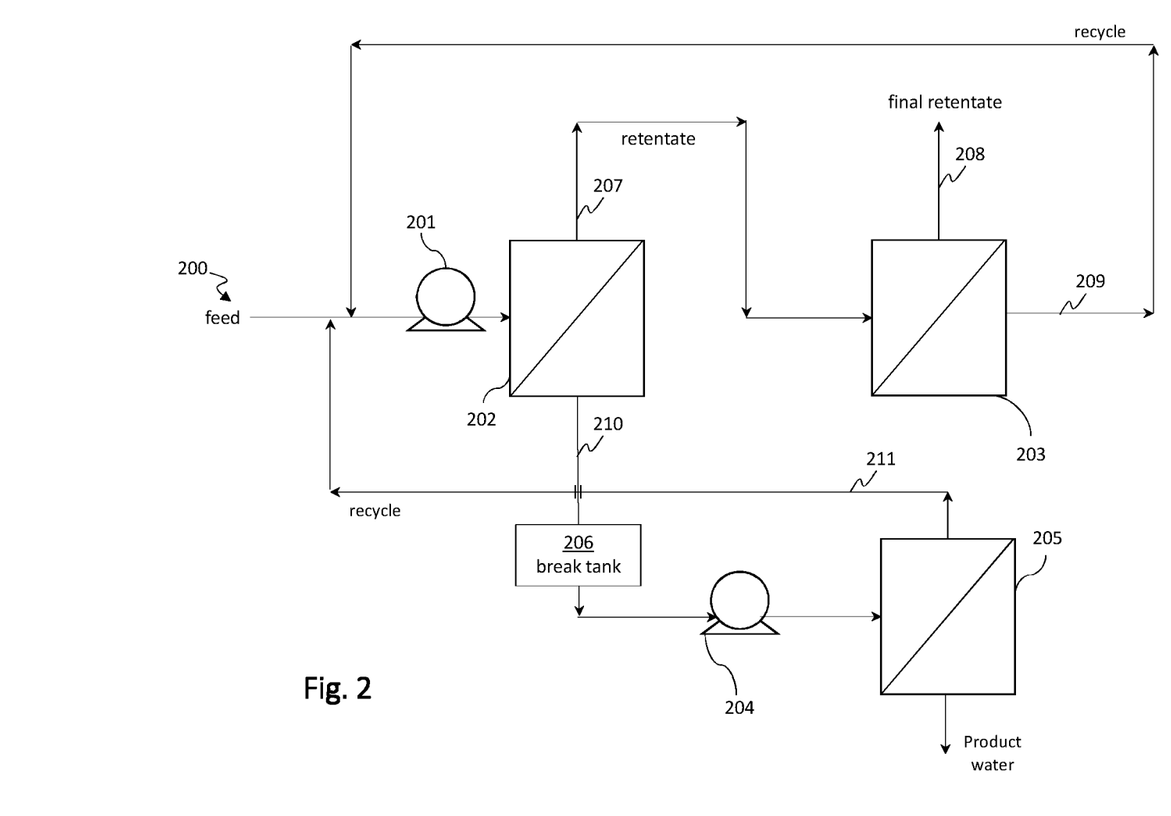
FIG. 2 is a diagram of a two-stage reverse osmosis system with a partial second pass, in accordance with an embodiment of the invention.

FIG. 2 is a diagram of a two-stage reverse osmosis system with a partial second pass configured to remove water from alcoholic beverages in accordance with an embodiment of the present invention. Feed 200 is pressurized by a high pressure pump 201 and directed to a first reverse osmosis unit 202. The feed, in this case typically contains between 1% and 25% ethanol by weight. In order to remove a significant portion of water from the beverage, it may be desirable to employ two or more stages (for example, 202 and 203) of reverse osmosis in the first pass. One or more of these stages may be operated at pressures of between 1,500 psi and 2,000 psi. Retentate 207 from the first reverse osmosis unit 202 is directed to a second reverse osmosis unit 203, which produces a final retentate 208 as well as a permeate 209 that is recycled back to mix with the feed 200. Since ethanol molecules are small and difficult to reject with reverse osmosis membranes, it may be desirable to direct permeate 210 from the first-pass, first-stage unit 202 to a second pass of reverse osmosis 205. Between units 202 and 205, a buffer tank (or flow pacing) and pump 204 can be used. The retentate 211 from the third reverse osmosis unit 205 is recycled back to mix with the feed 200.

In some embodiments, because the ethanol concentration of the permeate 209 from the second stage 203 is likely to be in a similar range to that of the liquid feed 200, it may be advantageous to recirculate the second stage permeate 209 back to the feed 200, rather than directing it to a fourth unit. Challenges with the approach related to FIG. 2 include:

Maintaining an oxygen-free and sanitary break tank. Oxygen seriously degrades the quality of beverages such as beer and wine. If a break tank is configured to be part of the reverse osmosis system, it therefore needs to be oxygen free, as well as sanitary. These requirements can increase cost and complexity of the overall system.

Careful permeate pacing. If one is to match the flow rate of the second pump 204 with the flow of the permeate 210 from the first reverse osmosis unit 202, one must pay particular attention that the inlet pressure to the pump 204 does not fluctuate too low or too high and cause cavitation damage or damage to the inlet seals of the pump 204.

Inflexibility. The system of FIG. 2 does not enable easy adjustment of the relative flow 210 to the second pass 205 versus the relative flow 209 that is directly recycled from the second reverse osmosis unit 203 to the feed 200.

Figure 3:
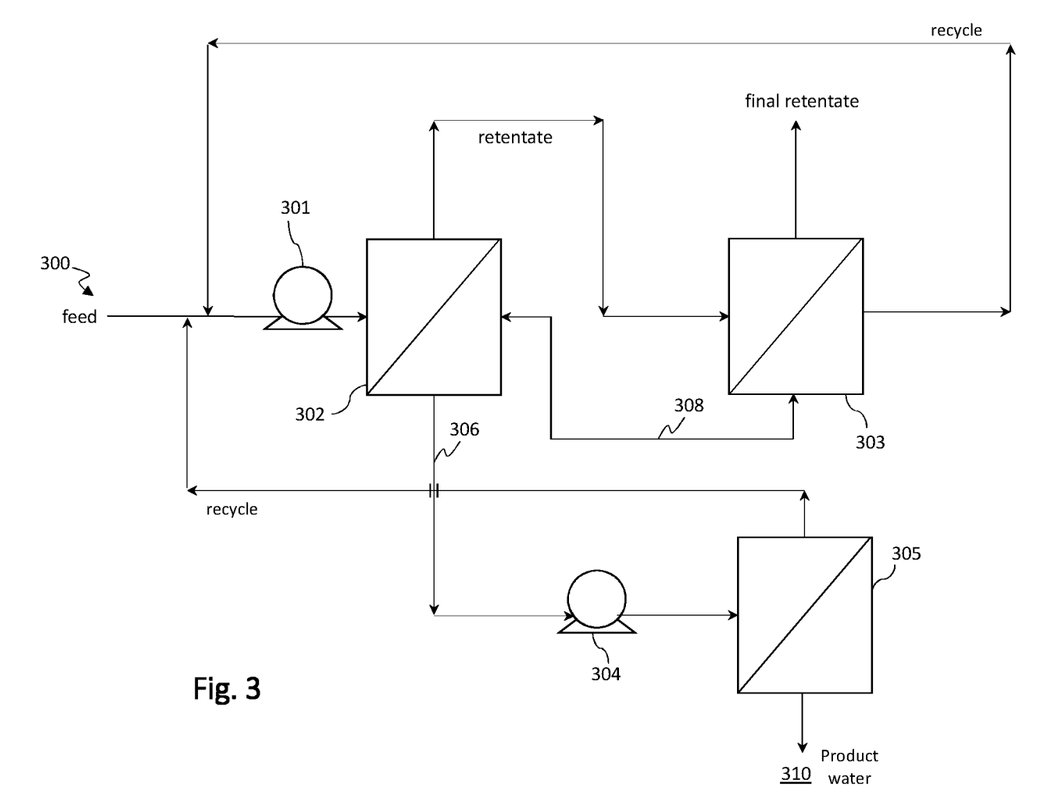
FIG. 3 is a diagram of a two-stage reverse osmosis system, including a fluid coupling between permeate outlets from the first reverse osmosis and the second reverse osmosis unit, in accordance with another embodiment of the invention.

FIG. 3 is a diagram of a two-stage reverse osmosis system, in accordance with another embodiment of the present invention, similar in some ways to that illustrated in FIG. 2, but including a fluid connection 308 between permeate outlets of the first reverse osmosis unit 302 and the second reverse osmosis unit 303. This connection 308 stabilizes the feed pressure to the second pump 304 and also allows (unlike a direct recycle to the feed 300), adjustment of the recycling flow to the feed 300 from the second pass reverse osmosis unit 305 by adjusting flow through the second pump 304.

FIG. 3 illustrates a significant modification to the system of FIG. 2, the modification allowing for more stable and flexible flow control. Specifically, the permeate core tubes of two or more reverse osmosis units in the first pass (which includes units 302 and 303) are fluidly coupled in series with one another. For example, the back permeate outlet of the first unit is coupled to the front permeate outlet of the second unit 303. At the same time, another permeate outlet of at least one unit (here, unit 302) involved in this coupling is fluidly coupled to the second pass pump 304 and another permeate outlet of at least one other unit (here, unit 303) involved in the coupling is fluidly coupled to the feed 300. In some embodiments, a permeate plug can be used to stop permeate flow from an end of one or more pressure vessels of a reverse osmosis unit. This design improvement has the following two important effects:

1. Stability. The permeates in connection 308 are fluidly coupled to the feed stream 300, and, therefore, are very close in pressure to the feed stream 300. The feed to the second pump 304 is also in fluid communication with these coupled permeates in connection 308 and, therefore, is also close in pressure to the feed pressure. In other words, this arrangement allows the second pass pump pressure to be anchored to the feed pressure to the high pressure pump 301. This configuration is more stable, provided the total permeate flow from 301 and 303 does not fall below the set-point for the flow rate of the second pump 304.

2. Flexibility. By controlling the flow rate of the second pass pump 304, one can control the percentage of the first pass permeate 306 going to a second pass 305 versus the percentage being recirculated directly to the feed 300.

Particularly advantageous, for high pressure applications such as the removal of water from alcoholic beverages, is the use of a high pressure positive displacement pumps for at least one of pump 304 and pump 301. In this case, the flow to the feed inlet of reverse osmosis unit 302 is set by pump 301. By adjusting a throttle valve placed on the final retentate stream from unit 303, one can control the total permeate flow rate from unit 302 and unit 303. The portion of permeate in line 306 directed to the second pass unit 305 is controlled using a variable frequency drive (VFD) powering pump 304. Finally, the amount of product water 310 produced from reverse osmosis unit 305 can be set by adjusting a retentate throttle valve placed on the retentate outlet of unit 305, since when the retentate throttle valve is closed, there is no retentate recycle flow to the feed 300 and so the product water flow at 310 is at a maximum, and, when the retentate throttle valve is wide open, the product water flow at 310 is at a minimum.

Series-Coupled Elements

In one embodiment, the above-described approach of FIG. 3 can be expanded by connecting front and back permeate ports of a set of reverse osmosis pressure vessels in one long snake-shaped configuration, wherein a front permeate port in a successive unit is fed by a back permeate port of a preceding unit, and in which a tail end of the snake is coupled to recycle permeate to the feed 300 and the head end of the snake is coupled to the second pass unit 305. Additionally each of the reverse osmosis filtration units 302 and 303, for example, can be implemented as a set of series-coupled reverse osmosis pressure vessels. If the pressure drop encountered in this approach through the permeate line is too great, one can instead place a permeate plug in one end of each pressure vessel and couple together the other permeate outlet of the pressure vessels in a manifold. Similarly, the feed inlet of a successive unit can be coupled to the retentate outlet of a predecessor unit.

Figure 4:
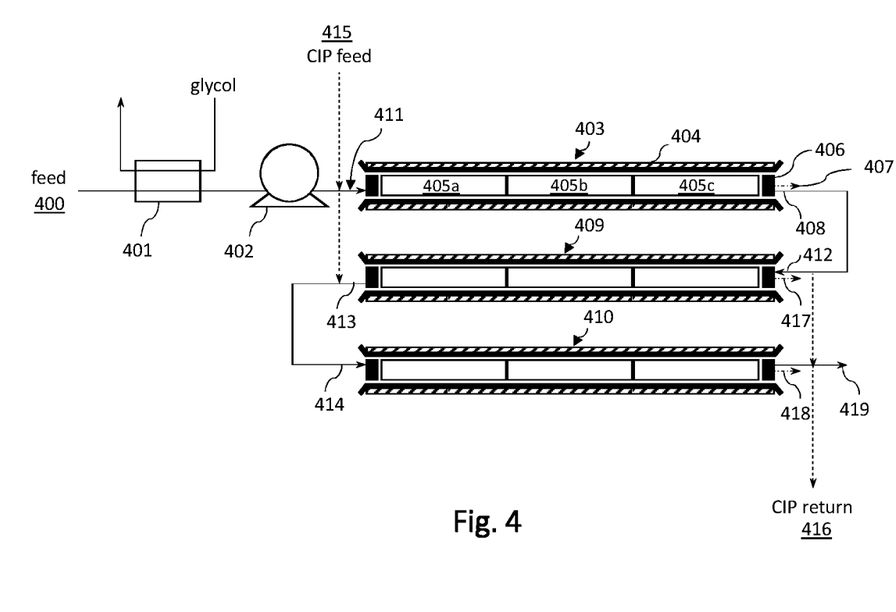
FIG. 4 is a diagram of a reverse osmosis system having series-connected filtration units, in accordance with another embodiment of the invention.

FIG. 4 is a diagram of such an expanded reverse osmosis system having series-coupled reverse osmosis pressure vessels in accordance with a further embodiment of the present invention. In this embodiment, a liquid feed 400 is cooled in a heat exchanger 401 (in this example, using a glycol as a coolant) and directed to a high pressure pump 402. In some embodiments, an additional pump can pre-pressurize the liquid feed 400 before the heat exchanger 401. The pump 402 pressurizes fluid at the feed inlet 411 of a first pressure vessel 403. The pressure vessel 403 contains a set of reverse osmosis membranes 405a, 405b, and 405c and is insulated to prevent heat loss with an insulating layer 404. The vessel 403 includes end caps or plates 406, a permeate outlet 407 and a retentate outlet 408. Fluid exiting the retentate outlet 408 is higher in ethanol concentration than fluid entering the feed inlet 411. Three pressure vessels 403, 409, and 410 are fluidly coupled such that the retentate outlet of one vessel is connected to the feed inlet of the next vessel. For example, the retentate outlet 408 is coupled to feed inlet 412 of vessel 409 and the retentate outlet 413 of vessel 409 is coupled to feed inlet 414 of vessel 410.

Owing to the long fluid path, in the embodiment of FIG. 4, between the feed 400 and the final retentate outlet, in some embodiments, clean-in-place (CIP) lines are coupled to the ends of the pressure vessels to provide a shorter path length for the purpose of cleaning the vessels after filtration of the subject liquid feed. Specifically, the CIP feed lines feed clean water to the pressure vessels in parallel and the CIP return lines collect the used water in parallel. In this example, a clean-in-place (CIP) feed line 415 is fluidly coupled to one end of the pressure vessels 403 and 409 (and the coupling between retentate outlet 413 and feed inlet 414 enables the clean water to enter pressure vessel 410), and a CIP return line 416 is fluidly coupled to the other end of the pressure vessels 409 and 410 (wherein the coupling between retentate outlet 408 and feed inlet 412 enables the cleaning water from pressure vessel 403 to enter the CIP return line 416), allowing for the cleaning of multiple vessels in parallel.

With reference to FIG. 4, in certain embodiments, the feed 400 may be a beverage or a precursor to an alcoholic beverage. For example, the feed 400 may be a beer, a high gravity beer, a cider, a wine, or a juice. The system of FIG. 4 is best employed with solutions containing between 1% and 40% ethanol by weight, and more typically solutions containing between 4% and 20% ethanol by weight. The system described is designed to beneficially allow the ethanol content of the feed 400 to be enriched to between 15% and 50% alcohol by weight, and more typically, to between 20% and 30% alcohol by weight. The embodiments described also beneficially improve long-term performance of the reverse osmosis membranes by facilitating an effective cleaning procedure (the CIP procedure described above) and minimizing axial compaction of the membrane elements.

In FIG. 4, the feed 400 enters a heat exchanger 401, so as to cool the liquid feed 400. By the time the feed 400 reaches the high-pressure pump 402, positioned after any heat exchangers 401, its temperature is between −5 degrees Celsius and 10 degrees Celsius or, more preferably, between the freezing point of the feed 400 and 3 degrees Celsius. This temperature specification is important in maximizing the rejection of ethanol by the reverse osmosis membranes. Typically, the heat exchanger 401 may have a glycol coolant flowing through it, entering at a temperature of between −5° C. and 2° C. To save on energy, it can be beneficial to have an additional heat exchanger that passes permeate from the overall system of FIG. 4 and recycles it to provide cooling to the feed stream 400 before the high pressure pump 402. The inclusion of a heat exchanger is important unless the beverage is stored at close to 0° C. In the event of a rise in temperature between the feed storage tank (not shown) and the high pressure pump 402 (due to heat generation in feed pumps or heat gain from the environment), additional cooling can be provided so as to maximize the ethanol rejection by the reverse osmosis membranes.

In the exemplary system of FIG. 4, the pressure in the one or more reverse osmosis membranes of the pressure vessels is typically between −7 psi gauge and 60 psi gauge. Ideally, if the feed 400 is carbonated, the pressure at the high-pressure pump inlet is no less than 10 psi gauge. The exemplary high-pressure pump 402 is typically a positive displacement pump, such as a piston pump with 316L stainless steel parts so as to provide improved corrosion resistance and cleanliness. The pump 402 should be rated for operation at an outlet pressure of at least 85 bar, and, preferably, at least 125 bar.

After the high-pressure pump 402, the feed enters a series of pressure vessels 403, 409, and 410. The pressure vessels are connected in series such that the retentate outlet port of one vessel is connected to the feed inlet port of the next vessel. The setup is such that flow path reverses direction ("zig-zags") at each connection between pressure vessels (for example, through vessel 403 left to right) and then through the next pressure vessel in a parallel but opposite direction (for example, through vessel 409 right to left). The pressure vessels can include between one and eight, or more preferably, three or four spiral wound elements 405a-405c, and each element is between 37 inches and 43 inches long. The elements may, for example, be four-inch diameter elements, or the elements may be eight-inch diameter elements. In reverse osmosis, it is beneficial to have more elements per pressure vessel, resulting in a reduction of the unit costs of the vessels. In some embodiments, six to eight elements per vessel are employed. However, in this case there are two good reasons for having fewer elements per vessel: (1) with three or four elements per pressure vessel, the whole system can fit inside a standard twenty foot container, for example, for shipping; and (2) with fewer elements per pressure vessel, there is less axial pressure loading on the elements, which increases element longevity (and reduces telescoping). This is particularly important when dealing with viscous solutions, which is the case with concentrated alcoholic beverages such as beer.

It is common to have two to four pressure vessels in series to achieve a process with higher recovery. By contrast, in the exemplary embodiment, it is better to have between five and twenty-five pressure vessels in series or, more preferably, between ten and twenty pressure vessels in series. Because the exemplary reverse osmosis system operates at low temperatures and often with fluids of high osmotic pressure, the permeate flow per element is quite low. To achieve a continuous process with such conditions, it becomes advantageous to have many elements (and consequently, a high number of pressure vessels) in series. Similar design principles disclosed here are also useful in designing continuous reverse osmosis dealcoholization systems and beer clarification systems (i.e. reverse osmosis systems employed for removing color and or flavor from beer or other beverages).

To be more cost-effective, the pressure vessels themselves may be fiberglass reinforced pressure vessels (FRPs), rated for operation at just under 120 bar. The FRPs may be designed to meet ASME pressure vessel codes. In an exemplary embodiment, the system can include a pressure relief valve on a retentate outlet of one of the pressure vessels that releases at above 120 bar. In an exemplary embodiment, the inner surface has a surface roughness value, $R_a$, ranging from about 0.38 µm to about 0.82 µm to improve its cleanability.

In some embodiments, to keep the fluid cold during processing, it is beneficial to insulate the pressure vessels, for example, with neoprene 404 having a thickness of between 0.5 cm and 3 cm. The neoprene sleeves of such thicknesses can be configured to easily slide over the pressure vessel 403, 409, or 410 during system assembly. To avoid moisture ingress, a barrier layer may be applied to the insulation and/or the edges of the neoprene sleeves may be sealed onto the pressure vessel with tape, paint or another impermeable sealant.

In some embodiments, both ends of the pressure vessels have end caps 406 with permeate and feed/retentate ports. In another embodiment, the ends of the vessel are sealed with large tri-clamp fittings, end-plates, or flanges. In another embodiment, the feed/retentate and permeate ports can be side ports to the pressure vessel (i.e., not through the ends of the pressure vessels) to free the ends of the pressure vessel for the changing of membranes through the end caps/plates.

In some embodiments, for draining and purging of the reverse osmosis filtration system, carbon dioxide or nitrogen gas connections are installed at a high point in the system so that liquid may be pushed through the system to drain or recovered into a feed or product tank.

Figure 5:
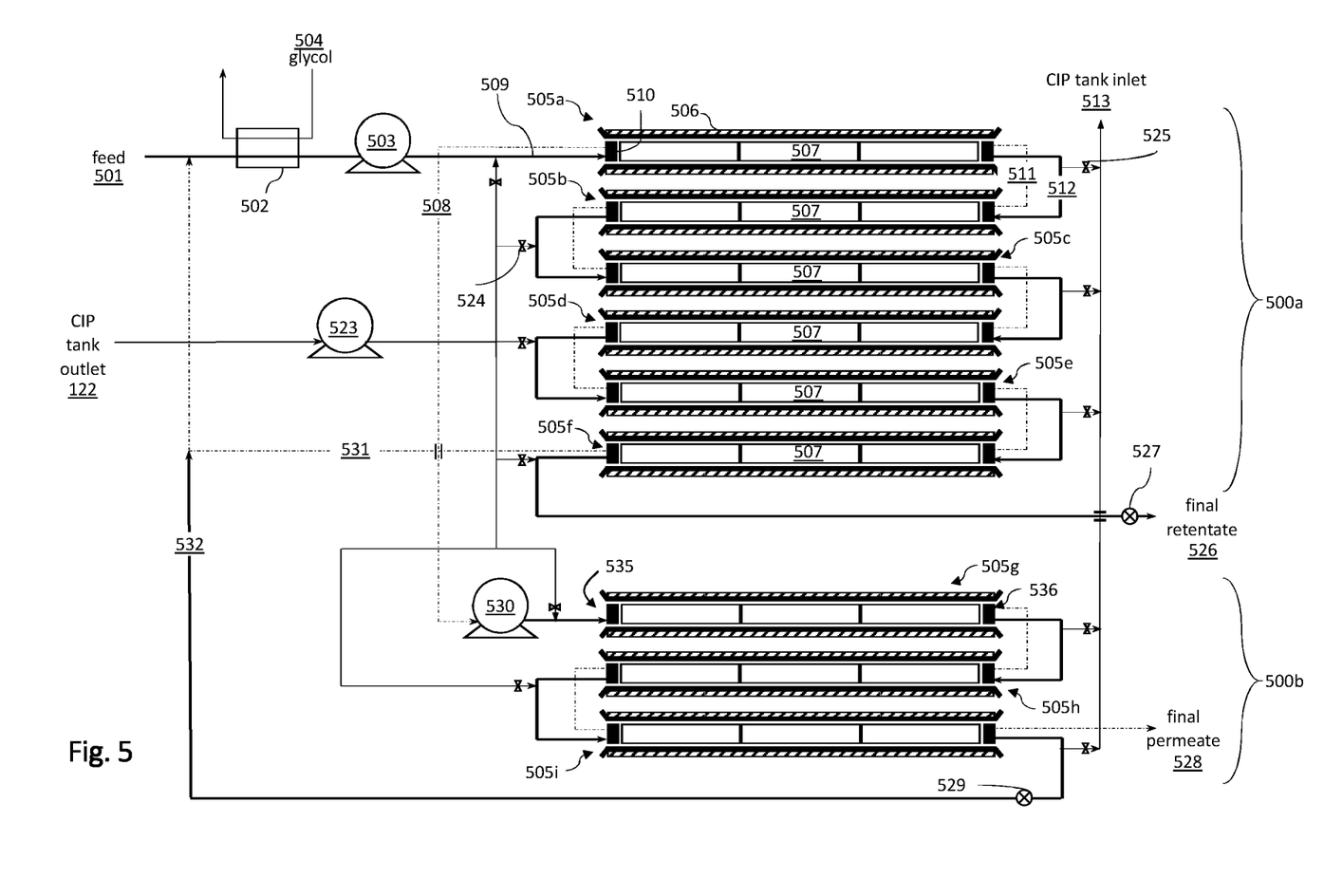
FIG. 5 is a diagram of a reverse osmosis system having series-connected filtration units in multiple passes, in accordance with another embodiment of the invention.

The cleaning of the reverse osmosis system can be slow and/or inefficient if cleaning liquids are pushed through the many pressure vessels and membranes in series. To mitigate this issue, a CIP manifold can be configured to feed some or all pressure vessels in parallel, as illustrated in FIGS. 4-5. This CIP manifold can be isolated during filtration operations by using high pressure valves to selectively couple to the pressure vessels. This selective coupling may be automated. In some embodiments, to achieve increased flow rates specific to cleaning, the CIP feed line(s) can be coupled to a separate pump that has a rated throughput of between five and twenty times the high-pressure pump 402. The separate pump operates at a much lower pressure than the high-pressure pump 402. An exemplary separate pump is rated for providing a pressure head of between 15 psi and 100 psi, or more preferably, between 30 psi and 60 psi. Moreover, the CIP feed line(s) can be between 50% and 200% larger in pipe diameter (to accommodate a greater flow rate at a lower pressure) than the lines containing the liquid feed 400 from the high-pressure pump 402 to the first pressure vessel 403.

In some embodiments, the permeate outlets 408, 417, 418 from the pressure vessels may be manifolded together in series or in parallel. Some permeate outlets may feed a second pass of reverse osmosis filtration and some permeate from these outlets may be recirculated to the liquid feed 400. In some embodiments, back-flow preventors can be installed on the permeate lines to avoid the risk of damaging the membranes. Back-flow preventors can take the form of cylinders having spring-loaded valves. When there is negative pressure in the system, the valve shuts and prevents a reverse flow of permeate through the membrane, causing delamination of the membrane. Note that the system of FIG. 4 is above atmospheric pressure. If any feed or concentrate lines were opened to ambient pressure, that would result in a reverse surge of permeate, which could permanently damage the reverse osmosis membranes. Thus, the back-flow preventors can avert this issue.

FIG. 5 is a diagram of a reverse osmosis filtration system having series-coupled pressure vessels in accordance with a further embodiment of the present invention. Feed solution 501 enters a heat exchanger 502 that is cooled with glycol 504. The feed solution 501 is then pressurized by a high-pressure pump 503. The low temperature pressurized feed 509 then enters a first pressure vessel 505*a* of multiple pressure vessels 505*x* (x=a, b, f). Each pressure vessel 505*x* contains multiple spiral wound membrane elements 507. Each pressure vessel 505*x* has an end cap 510 at either end, each end cap having a retentate port and a permeate port. Retentate exits the first pressure vessel and is coupled through line 512 to the inlet of second pressure vessel 505*b*. As previewed by FIG. 4, the retentate stream then snakes through the remaining first-pass 500*x* (where x=c, d, f) pressure vessels on the retentate side of the membranes before reaching throttle valve 527 to yield the final retentate 526.

Also as previewed by FIG. 4, a similar snake is employed with respect to the permeate side of the reverse osmosis filters. For clarity of illustration, the permeate conduits are presented in a dot-dashed line, and are a part of the embodiment described. The front permeate outlet of the first vessel 505*a* is coupled via conduit 508 to the feed inlet of a second high pressure pump 530, which feeds a second stage of series coupled vessels 505*y* (where y=g, h, i). Optionally, a heat exchanger can be implemented before pump 530 in order to reduce temperature and improve ethanol rejection in the second pass vessels 5505*y*. The "snaking" method disclosed herein is advantageous for the reasons articulated in connection with FIG. 3, for example, with regard to the stability and flexibility of the system.

The back permeate port of the first vessel 505a is coupled via conduit 511 to the front permeate port of the second vessel 505b. The back permeate port of the second vessel 505b is coupled to the front permeate port of the third vessel 505c, and so on, until the back permeate port on the sixth vessel 505f is coupled via conduit 531 to recycle a portion of the permeate back to the feed 501.

As previously mentioned, fluid in conduit 508 is pressurized by high-pressure pump 530 and directed to the inlet of a first pressure vessel 505g in the second stage. This fluid on the retentate side of 505g flows, in series fashion (with conduits for this purpose shown in solid), from a retentate outlet to through a conduit to an inlet of vessel 505h, and from the retentate outlet of 505h to the inlet of vessel 505i, and finally from the retentate outlet of 505i to reach throttle valve 529 in series with conduit 532 for recycling fluid to the feed 501. In the second stage, the permeate flow is similarly in series (with conduits for this purpose shown in dot-dashed lines). (The front permeate outlet 535 on pressure vessel 505g is capped to prevent permeate flow from the end. The back permeate outlet 536 of vessel 505g is coupled to the front permeate outlet of a pressure vessel 505h. The back permeate outlet of pressure vessel 505h is coupled to the front permeate outlet of vessel 505i. The back permeate port of vessel 535i provides the final permeate 528.

As described in connection with FIG. 4, the system of FIG. 5 is similarly equipped with a cleaning in place (CIP) arrangement. A cleaning or rinsing tank outlet 522 is fluidly coupled to a cleaning pump 523. This pump feeds cleaning water to pressure vessels 505a-505i in parallel in a manner analogous to the CIP arrangement of FIG. 4. In some embodiments, because the permeate side of the reverse osmosis filters experiences predominately solvent (such as water), the cleaning fluid is fed on the retentate side of the pressure vessels, by entering on the left side (regardless whether entering an inlet or a retentate port, and exiting on the right side (again regardless whether from an inlet or a retentate port) of each pressure vessel. After passing from left to right through the vessels, the cleaning water is returned over a line to the CIP tank inlet 513.

The parallel connections may be blocked by closing high pressure valves 524 and 525. (For clarity of illustration, only the first valve 524 on the left and the first valve 525 on the right is called out, but similar valves below each such enumerated valve are encompassed by these references.) When such valves are opened, the system may be flushed with cleaning fluid in parallel. When the valves are closed, the filtration system can operate in series described above. In some embodiments, the high pressure valves 524 and 525 are implemented by ball valves.

Figure 6A:
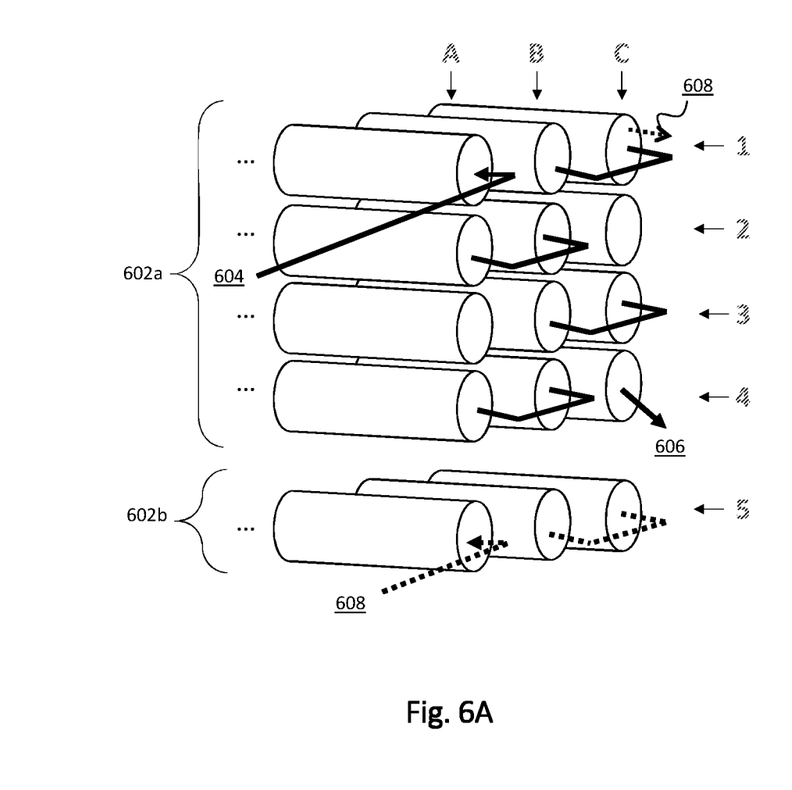
FIGS. 6A-6B is a diagram showing one end of first and second pass of reverse osmosis pressure vessels configured to be used in a system such as those provided in FIGS. 2-5, in accordance with another embodiment of the invention.
Figure 6B:
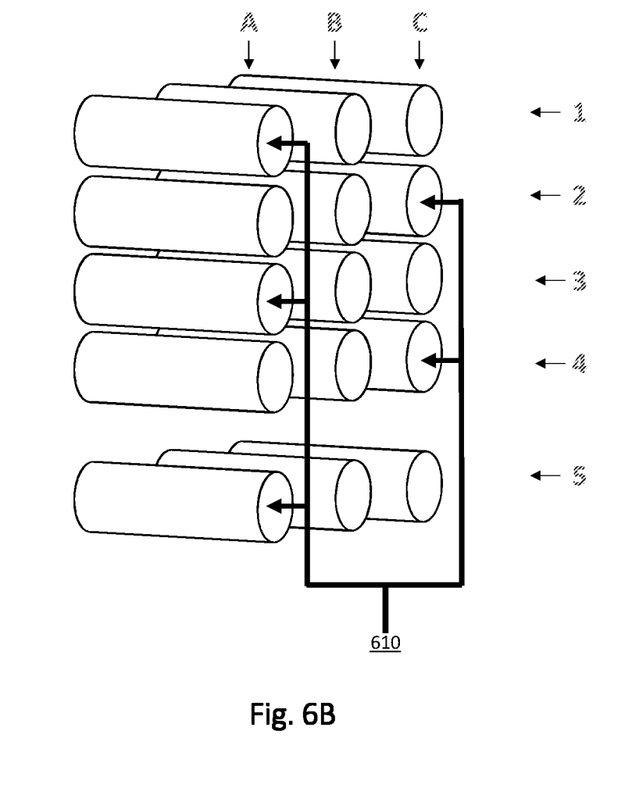

FIGS. 6A-6B show one end of first and second pass of reverse osmosis pressure vessels configured, in accordance with an embodiment of the present invention, to be used in a systems such as those illustrated in FIGS. 2-5. By the use of dark solid lines, FIG. 6A illustrates the inlet/retentate coupling of the pressure vessels in a first pass 602a and second pass 602b. The pressure vessels here are identified by their placement in the grid having columns A through C and rows 1 through 5. The feed 604 is coupled to the inlet of the first vessel A1 and flows to the retentate outlet at the other end (not shown) of vessel A1. The retentate outlet at the other end of vessel A1 then is coupled to the inlet of vessel B1, and the retentate outlet of vessel B1 is coupled as shown to the inlet of C1. The retentate outlet of C1 is coupled to the inlet of A2, and then a similar flow pattern occurs through the pressure vessels in the second row. Thus the inlet/retentate flow snakes or winds its way through the first four rows of the vessel system and outputs retentate 606. In the last row 602b, the feed 608 is the permeate from pressure vessel A3. This permeate 608 is fed through these pressure vessels A5, B5, and C5. Note that, in some embodiments, permeate ports of pressure vessels in some rows can be coupled or manifolded in parallel instead of series. For example, pressure vessels A1, B1, and C1 can be manifolded in parallel while pressure vessels A2, B2, and B3 are coupled in series. Further, pressure vessels A3, B3, and C3 can be coupled in series while pressure vessels A4, B4, and B4 are manifolded in parallel. This is because manifolding in parallel reduces pressure drop compared to manifolding in series. A complete snake-through of all of the pressure vessels is only required if one desires full flexibility as to the fraction of flow to be directed through the head of the snake (for example, one or more pressure vessels of the first row A1, B1, C1) versus the tail of the snake (for example, or more pressure vessels of the fourth row A4, B4, C4), i.e., 0-100% of the flow. Often, partial flexibility is sufficient. For example, one may only need the flow through the head of the permeate snake to be between 25% and 75% of the snake. Such flexibility can be achieved by having permeate ports of pressure vessels in the middle of the snake be manifolded in series. Permeate ports towards either end of the snake may also be manifolded in parallel.

FIG. 6B illustrates the cleaning manifold 610 that is connected in parallel to each row of pressure vessels. Thus, the left side of cleaning manifold 610 is coupled to rows 1, 3, and 5 while the right side of the manifold 610 is coupled to rows 2 and 4.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A reverse osmosis filtration system comprising:
   a set of two or more reverse osmosis pressure vessels coupled in series, each pressure vessel having:
   one or more reverse osmosis membrane elements;
   a feed inlet;
   a retentate outlet; and
   a permeate outlet, the pressure vessels being coupled so that each successive pressure vessel has (a) its feed inlet coupled to the retentate outlet of its preceding pressure vessel and (b) its permeate outlet coupled to the permeate outlet of its preceding pressure vessel, wherein the permeate outlet of at least one pressure vessel includes a front permeate outlet and the permeate outlet of at least one other pressure vessel includes a back permeate outlet, wherein the back permeate outlet of one pressure vessel is coupled to the front permeate outlet of a successive pressure vessel, and
   wherein the permeate outlet of a last pressure vessel in the set, selected from the group consisting of a front permeate outlet of the last pressure vessel and a back permeate outlet of the last pressure vessel, is coupled to the feed inlet of a first pressure vessel in the set to provide a recycling flow path.

2. A filtration system according to claim 1, wherein the set includes up to 25 reverse osmosis pressure vessels.

3. A filtration system according to claim 1, wherein each of the pressure vessels has three to four reverse osmosis membrane elements.

4. A filtration system according to claim 1, wherein each reverse osmosis membrane element is spiral wound.

5. A filtration system according to claim 1, wherein each reverse osmosis membrane element is about 37 to about 43 inches in length.

6. A filtration system according to claim 1, wherein the filtration system is configured to filter ethanol from alcoholic beverages.

7. A filtration system according to claim 1, further comprising a first pass unit having a first stage unit and a second stage unit, wherein the set of two or more filtration vessels is distributed between the first and second stage units.

8. A filtration system according to claim 1, wherein the feed inlet of a first one of the set of two or more pressure vessels is coupled to a high-pressure pump.

9. A filtration system according to claim 8, wherein an inlet of the high-pressure pump is coupled to a heat exchanger.

10. A filtration system according to claim 9, wherein an inlet of the heat exchanger is coupled to a low-pressure pump.

11. A filtration system according to claim 1, wherein the permeate outlet of the first pressure vessel in the set, selected from the group consisting of a front permeate outlet of the first pressure vessel and a back permeate outlet of the first pressure vessel, is coupled to a high-pressure pump.

12. A filtration system according to claim 11, wherein the high-pressure pump coupled to the permeate outlet of the first pressure vessel is further coupled to an inlet of one of an additional set of reverse osmosis pressure vessels, each of the pressure vessels of the additional set being coupled in series to one another.

13. A filtration system according to claim 1, further comprising a set of cleaning inlets coupled to a cleaning tank, each cleaning inlet coupled in parallel to a feed inlet or retentate outlet of a first end of a corresponding one of the set of pressure vessels.

14. A filtration system according to claim 13, further comprising a set of cleaning outlets, each cleaning outlet coupled in parallel to a feed inlet or retentate outlet of a second end of a corresponding one of the set of pressure vessels.

15. A filtration system according to claim 13, further comprising a low-pressure pump coupled to the set of cleaning inlets.

16. A filtration system according to claim 1, wherein the set comprises at least three pressure vessels and the permeate outlet of an intermediate one of the set, selected from the group consisting of a front permeate outlet of the intermediate one and a back permeate outlet of the intermediate one, is coupled to the feed inlet of the first pressure vessel in the set.

17. A filtration system according to claim 1, further comprising at least one back-flow preventor configured to prevent a reverse surge of permeate through the one or more reverse osmosis membrane elements.

* * * * *